Nov. 27, 1956 W. T. COLE 2,772,064
HINGE GUARD LOAD PROTECTOR
Filed Aug. 10, 1953 2 Sheets-Sheet 1

INVENTOR.
William T. Cole
BY Frease & Bishop
ATTORNEYS

Nov. 27, 1956     W. T. COLE     2,772,064
HINGE GUARD LOAD PROTECTOR
Filed Aug. 10, 1953     2 Sheets-Sheet 2
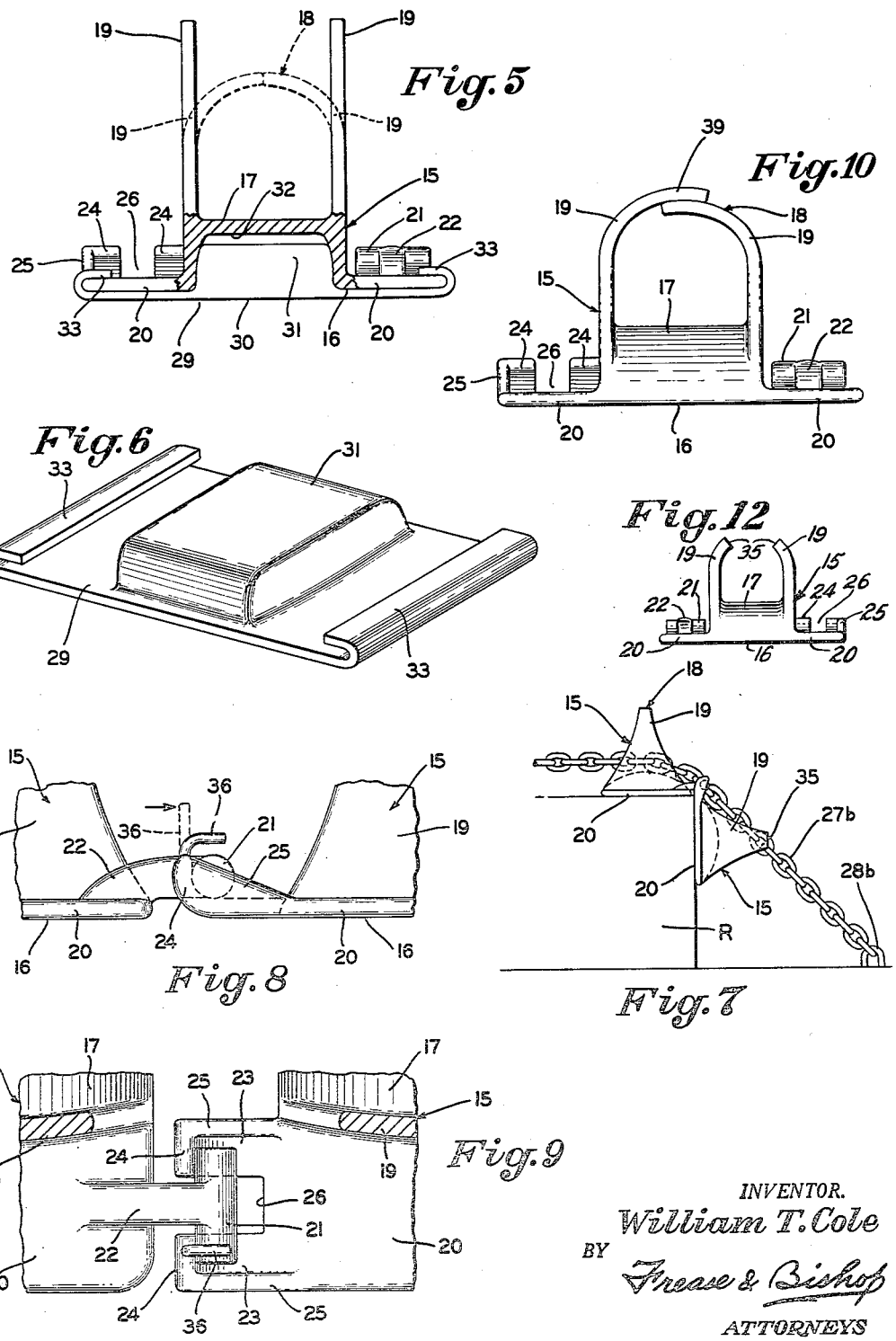
INVENTOR.
William T. Cole
BY
Frease & Bishop
ATTORNEYS

United States Patent Office 2,772,064
Patented Nov. 27, 1956

2,772,064

HINGE GUARD LOAD PROTECTOR

William T. Cole, Canton, Ohio, assignor to The Canton Manufacturing Company, Canton, Ohio, a corporation of Ohio Application August 10, 1953, Serial No. 373,173

8 Claims. (Cl. 248—361)

The invention relates to protectors for loads which are bound upon trucks, railways cars and the like or suspended by flexible means such as chains, cables, or ropes, and more particularly to such a device in the form of a hinged guard located between the load and the chain or other flexible binding element.

It is an object of the invention to provide such a guard or load protector formed of two similar members adapted to be detachably hinged together so that the two members of the composite unit may be positioned at any angle from 90 degrees to 180 degrees.

Another object is to provide such a load protector in which each member has a convex surface for holding the chain or other flexible unit spaced from the load, and a loop or eye through which the chain is threaded.

A further object of the invention is to provide such a device with a liner of rubber or the like to prevent scratching or marring of the load.

A still further object is to provide means upon each member of the unit for preventing the members from becoming detached from each other.

A further object is to provide any easy means of placing a chain or other flexible member in the eye of the load protector without threading it through the eye, and not allowing the chain or other flexible member to become disconnected therefrom while in normal holding or lifting position.

Another object of the invention is to provide such a load protector in which the loop or eye on one member of the unit may be opened so as to permit the chain or other binding element to extend at an angle away from the load toward the anchor point.

Figure 1:
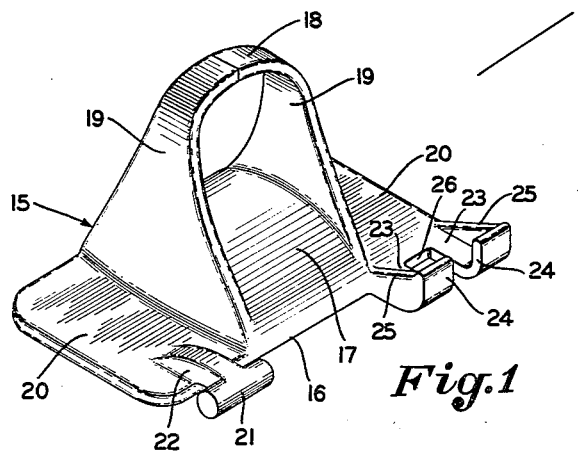
Figure 3:
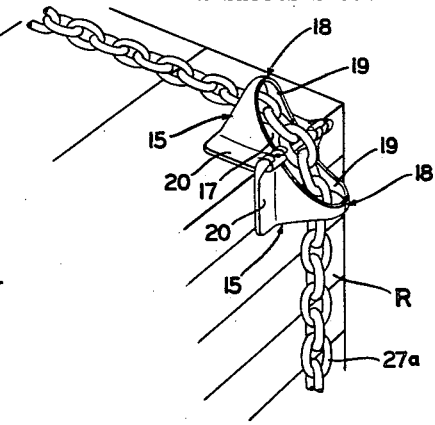
Figure 2:
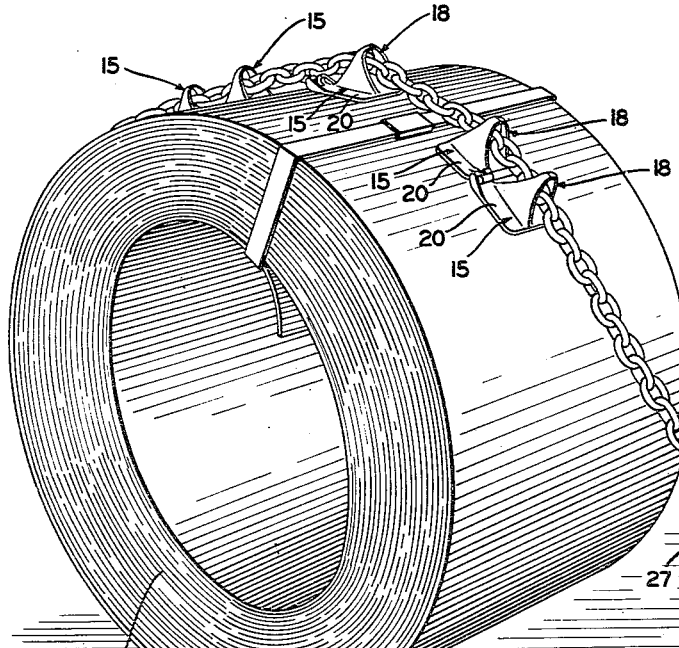
Figure 4:
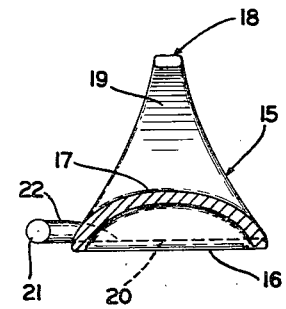
Figure 11:
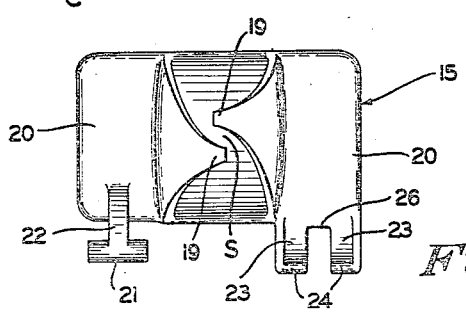

The above objects together with others which will be apparent from the drawings and following description, or which may be later referred to, may be attained by constructing the improved hinge guard in the manner hereinafter described in detail and illustrated in the accompanying drawings, in which;

Fig. 1 is a perspective view of one of the similar members forming the improved hinge load protector unit;

Fig. 2 a perspective view showing the manner in which the improved load protector may be applied to a chain or the like for binding a coil of metal or other cylindrical load;

Fig. 3 a perspective view showing the manner in which the improved load protector may be used as a hinge guard at the corner of a rectangular load;

Fig. 4 a vertical, longitudinal sectional view through one member of the hinged unit;

Fig. 5 a vertical, transverse sectional view through one member of the unit showing the manner in which a rubber liner may be connected to the underside thereof;

Fig. 6 a detached, perspective view of the rubber liner shown in Fig. 5;

Fig. 7 a fragmentary elevation showing the manner in which the hinged guard may be applied to the corner of a rectangular load permitting the chain or other flexible binding element to extend outwardly from the load to the anchor point;

Fig. 8 a fragmentary elevation of the hinge connection of the two members of the unit showing means for preventing the members from becoming detached from each other;

Fig. 9 a fragmentary plan view of the structure shown in Fig. 8;

Fig. 10 a front elevation of one member of the unit showing the manner in which the loop or eye may be reduced in diameter for permanently attaching the same to the binder chain;

Fig. 11 a plan view of a modified form of unit; and

Fig. 12 a front elevation of one member with the ends of the arms cut off.

Referring now more particularly to the embodiments illustrated in the drawings, in which similar numerals refer to similar parts throughout, the improved load protector is made in the form of a hinged guard comprising two similar units each of which is indicated generally at 15 and is preferably in the form of a malleable iron casting.

Each of the members 15 has a flat bottom surface 16, for contact with the load to be bound, and a convex upper surface 17 over which the chain, cable or other flexible binding element is located. A loop or eye, indicated generally at 18, is located transversely above the convex surface 17 and is preferably formed of two upwardly tapered arms 19 which may be cast in straight position, as indicated in full lines in Fig. 5, and then bent toward each other as shown in broken lines to form the eye or loop 18.

A flat flange 20 is formed at each side of the member 15 for contact with the load to be bound. For the purpose of detachably connecting two of the members together to form a hinged guard or load protector, a hinge pin 21 may be formed upon the lug 22 which is integrally formed upon the top surface of one of the flanges 20 and extends outwardly therefrom, as best shown in Fig. 1.

In the corresponding edge of the other flange 20 is formed a pair of outwardly extending ears 23 having integral lugs 24 at their outer ends and tapered integral flanges 25 at their outer sides, forming an open hinge knuckle for receiving the hinge pin 21 of the other member of the unit, the lug 22 thereof being free to swing through the slot 26, between the ears 23, as the hinge pin pivots within this knuckle.

The two members 15 may thus be hingedly connected together in the manner shown in Figs. 2 and 3. In applying the improved hinge guard to a cylindrical load, such as the coil of steel indicated at C in Fig. 2, any suitable arrangement of the devices may be made over the upper side of the coil, preferably as shown in said figure, to receive the chain or other flexible binding element 27.

Preferably, as shown in Fig. 2, one of the hinged units is located at each side of the cylindrical load at the point where the chain extends away from the load to the anchor means indicated at 28 to which the end of the chain is connected.

As shown in the drawings, the chain 27 is threaded through the eyes 18 of the members 15, contacting the convex surfaces 17 thereof, and as the chain is tightened the under surface of the members 15 are drawn tightly against the surfaces of the load.

The eyes 18 are made of sufficient diameter to permit a grab hook upon the chain to be threaded therethrough. As shown in Fig. 2, a single member 15 may be located at the top of the load, between the hinged units, to hold the chain out of contact with the entire top surface of the load.

In Fig. 3 is shown the manner in which the hinged guard is used as a protector for corners of a rectangular load indicated at R. As shown in this figure the two similar members 15 forming the hinged guard are located over an upper corner of the load, one member 15 being held flat against the top of the load and the other member held flat against the side of the load, so that the chain 27a passing around this corner of the load is held out of contact with the corner of the load whereby the chain can safely be drawn much tighter without in any way cutting into or damaging the load.

For the purpose of preventing scratching or marring loads of certain types of material, a rubber liner may be provided upon the underside of each member 15 of the load protector, as shown in Fig. 5. This rubber liner is indicated at 29 and may have a flat under surface 30 and a central block 31 adapted to be received within the recess 32 below the convex upper surface 17 of the member 15.

The ends of the rubber liner 29 may be formed into upwardly and rearwardly disposed channels 33 to be engaged over the outer edges of the flanges 20 of the member 15, as shown in Fig. 5. It will thus be seen that this rubber liner may be quickly and easily attached to the under surface of any member 15 upon which it may be desired to use the same.

As shown in Fig. 7 the improved hinged guard may be located over the corner of a rectangular load R, in cases where the chain 27b extends outwardly away from the corner of the load to the anchor point 28b. For this purpose the outer ends of the arms 19 of one member 15 may be cut off as at 35 as shown in Fig. 12, or the arms may remain straight as shown in full lines in Fig. 5 so that the chain 27b may extend downward and outward at an angle as shown in Fig. 7, while holding both members of the hinged guard tightly against the load.

If it is desired to permanently attach the two members 15 of the hinge guard together, a finger 36 may be formed upon one of the lugs 24 of each hinge knuckle and then, after the two members 15 have been hingedly connected together, the finger 36 may be bent over the hinge pin 21 as shown in full lines in Figs. 8 and 9, so as to prevent the two members 15 from becoming detached from each other.

If it is desired to reduce the diameter of the eye 18 of any member 15 in order that a grab hook upon the chain cannot be pulled therethrough after the chain has been threaded through the eye, the two arms 19 forming the eye may be further bent as indicated at 39 in Fig. 10.

In Fig. 11 is shown a modification of the unit designed to permit a chain or other flexible member to be easily and quickly attached thereto without requiring that it be threaded through the eye of the unit, and arranged to prevent the chain or the like from being accidentally disconnected from the unit in normal holding or lifting position.

For this purpose the arms 19 are off-set from each other in the same plane, a sufficient distance to leave a space S therebetween, through which the chain or other flexible member may be inserted at an angle to the normal directional pull, and then properly positioned within the eye.

When the chain or the like is then applied around the load it will be retained within the eye and prevented from accidental displacement.

From the above it will be seen that a simple, inexpensive and efficient load protector is provided which gives positive protection to loads of all types of material such as steel coils or other cylindrical loads, sheets, pipes, tubes, lumber, clay products, machinery, paper board and the like, the chain or cable binder being prevented from cutting into the load or damaging it in any way.

It will also be seen that with the hinged guard above disclosed the chain or cable can safely be drawn much tighter than in conventional practice so that the loads can be made more compact and less likely to shift in transit.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A load protector for use in connection with a flexible binding member, said load protector comprising a pair of similar cast malleable iron members, each member having a substantially flat lower surface for contact with a load, a convex upper surface for contact with a flexible binding member and a guide projecting upwardly therefrom for receiving the flexible binding member, and integral cooperating means upon the members hingedly connecting said members together, whereby said load protector may be located at any desired point upon the flexible binding member, and the two hingedly connected members may be positioned at any angle from 90 degrees to 180 degrees to conform to the contour of the load.

2. A load protector as defined in claim 1, in which the means hingedly connecting the members together comprises an integral hinge pin and an integral hinge knuckle on each member engaging the hinge knuckle and hinge pin respectively on the other member.

3. A load protector as defined in claim 1, in which a flat flange is provided on each side of each member, and in which the means hingedly connecting the members together comprises an integral lug projecting from one flange and having an integral hinge pin therein and a spaced pair of ears projecting from the other flange and having integral lugs thereon forming a hinge knuckle.

4. A load protector as defined in claim 3, in which an integral finger is provided upon each hinge knuckle, said finger being bendable over the hinge pin of the other member for preventing detachment of the members.

5. A load protector as defined in claim 1, in which there is a central recess in the lower side of each member and in which a flat flange is provided on each side of each member, and a rubber liner upon the lower side of each member having a central enlarged portion located in said recess and channel portions at the ends of said rubber liner receiving the edges of said flanges.

6. A load protector as defined in claim 1, in which the upper portion of the guide on one member is open to permit the flexible binding member to extend away from the load at an angle.

7. A load protector as defined in claim 1, in which the guide on each member comprises an upright arm on each side of said convex surface, said arms being bendable toward each other to form an eye.

8. A load protector as defined in claim 1, in which the guide on each member comprises an upright arm on each side of said convex surface, said arms being bendable toward each other to form an eye, the ends of the arms being offset in the same plane providing a space therebetween through which the flexible member may be inserted.

(References on following page)

References Cited in the file of this patent

UNITED STATES PATENTS

| | | |
|---|---|---|
| 399,964 | Benet | Mar. 19, 1889 |
| 871,099 | Baker | Nov. 19, 1907 |
| 968,455 | Estabrook | Aug. 23, 1910 |
| 1,003,108 | Hinrichs | Sept. 12, 1911 |
| 1,107,451 | Schroeder | Aug. 18, 1914 |
| 1,208,667 | Sammel | Dec. 12, 1916 |
| 1,412,875 | Knuth | Apr. 18, 1922 |
| 1,644,278 | Romine | Oct. 4, 1927 |
| 1,922,127 | Foley | Aug. 15, 1933 |
| 2,353,017 | Denton | July 4, 1944 |

FOREIGN PATENTS

| | | |
|---|---|---|
| 229,300 | Switzerland | Jan. 17, 1944 |
| 332,550 | Great Britain | July 21, 1930 |